J. McALEAR.
HEATING SYSTEM.
APPLICATION FILED JULY 6, 1905.

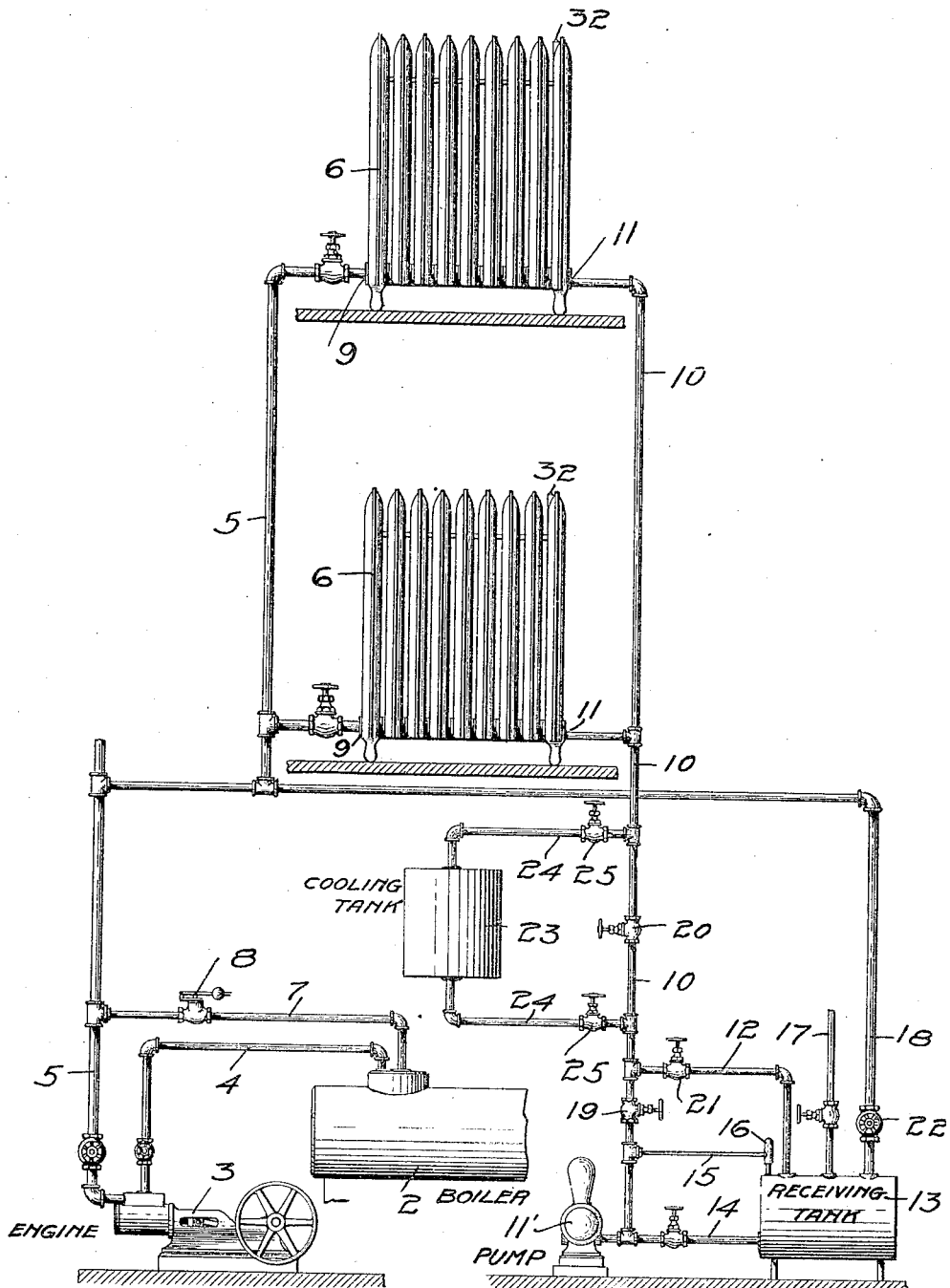

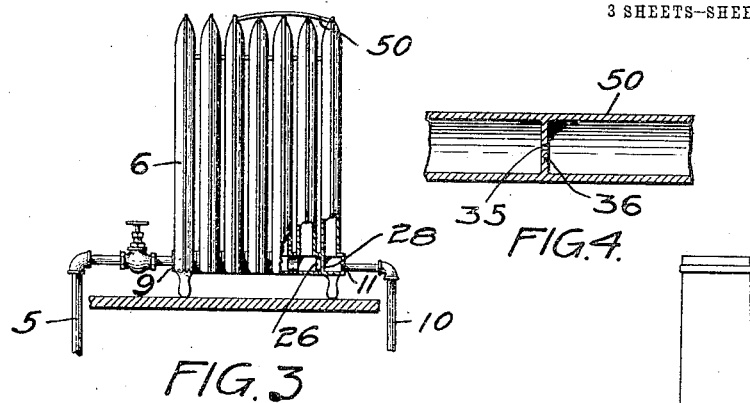
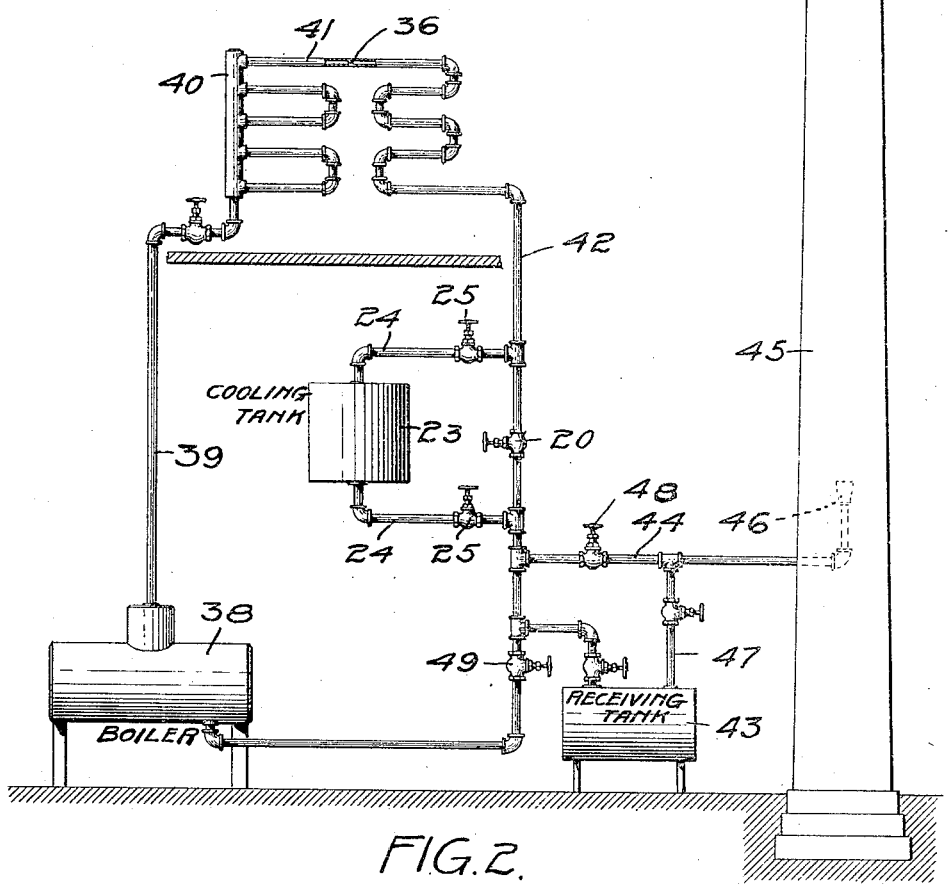

1,122,781.

Patented Dec. 29, 1914.
3 SHEETS—SHEET 3.

WITNESSES

INVENTOR
JAMES McALEAR
BY Paul & Paul
HIS ATTORNEYS

UNITED STATES PATENT OFFICE.

JAMES McALEAR, OF ST. PAUL, MINNESOTA.

HEATING SYSTEM.

1,122,781.   Specification of Letters Patent.   Patented Dec. 29, 1914.

Application filed July 6, 1905. Serial No. 268,445.

*To all whom it may concern:*

Be it known that I, JAMES MCALEAR, of St. Paul, Ramsey county, Minnesota, have invented certain new and useful Improvements in Heating Systems, of which the following is a specification.

My invention relates to steam heating systems and has for its object to provide a new and improved system of this description.

The object of my invention is to provide a heating system which is economical to construct and maintain.

A further object is to provide a heating system wherein the ordinary radiator air valves are entirely dispensed with, and the annoyance to occupants of a dwelling and the damage to furniture and decorations, resulting from the discharge of water and steam from such valves, is avoided.

A further object is to provide a heating system wherein a considerable saving in steam is effected by removing the air from the radiators without discharging it into the room.

The invention consists generally in a suitable source of heat having supply or service pipes and radiators communicating with said supply pipes and having drip openings and constricted passages connecting said supply and drip openings and through which only air and a relatively small proportion of steam pass, and a suitable exhauster connected with said drip openings.

Further, the invention consists in various constructions and combinations, all as hereinafter described and particularly pointed out in the claims.

Figure 6:
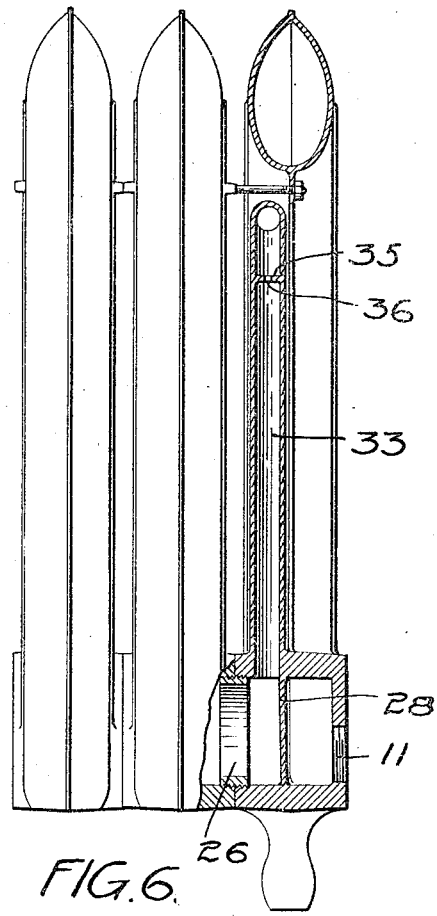
Figure 5:
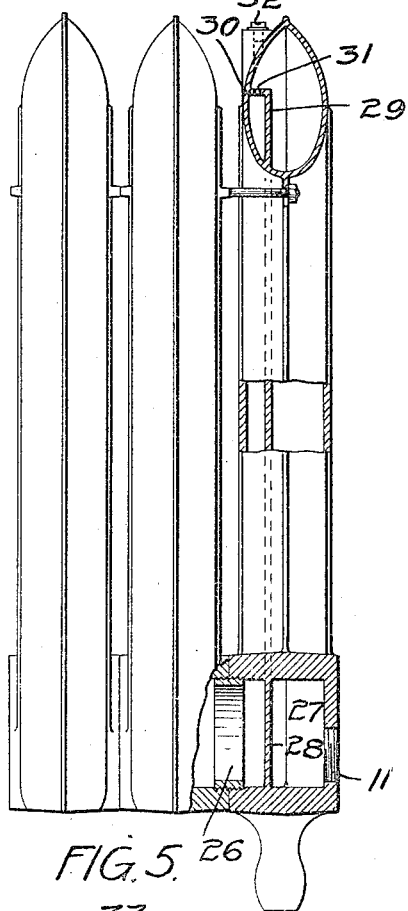
Figure 7:
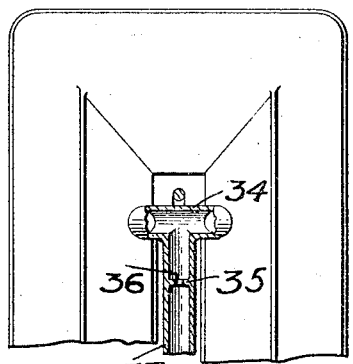
Figure 8:
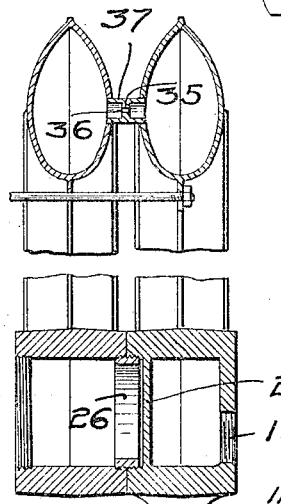

In the accompanying drawings forming part of this specification, Figure 1 illustrates a form of heating system embodying my invention. Fig. 2 illustrates another form of heating system also embodying my invention. Fig. 3 is a side elevation of a radiator showing the imperforate wall separating the supply and drip openings, and the pipe at the top of the radiator containing the constricted passage. Fig. 4 is a detail sectional view of a pipe showing a partition or wall therein with a constricted opening extending through it. Fig. 5 is a detail view partially in section, of one end of a radiator illustrating the wall between the supply and outlet openings and showing the constricted passage located within and near the top of one of the sections. Fig. 6 is a similar view of a modification, the constricted passage being between the legs of one of the sections instead of inclosed thereby. Fig. 7 is a detail view illustrating in section the constricted passage shown in Fig. 6. Fig. 8 is a sectional view of one end of a radiator showing still another form of constricted passage.

In Fig. 1 of the drawing, 2 represents a boiler, or source of heat, and 3 an engine connected with the boiler through the pipe 4 and having a supply or service pipe 5 leading from its exhaust to the radiators 6 located at any suitable distance, and of any suitable size and shape. A pipe 7 having a reducing valve 8 leads from the boiler to the supply pipe 5, to allow the system to take steam direct from the boiler, if desired, without passing through the engine. The pipe 5 communicates with the radiators through the supply ports or openings 9 therein, and a pipe 10 leads from the drip openings 11 at the opposite end of the radiator or heater. This pipe 10 leads to a pump 11' and has a branch pipe 12 to a receiving tank 13, which also has a connection 14 with the pump, and a branch pipe 15 to the pipe 10 provided with an air valve 16. A pipe 17 leads from the tank 13 to the atmosphere, and a pipe 18 leads from said tank to the supply pipe 5. These pipes are all equipped with suitable valves for regulating the flow of steam, water or air therethrough. The most important of these valves may be designated by reference numerals 19, 20, 21 and 22. A tank 23 has pipe connections 24 provided with valves 25 and which communicate with the pipe 10 above and below the valve 20. Upon closing this valve 20 and opening the valves 25, the vapor or discharge from the drip opening can be diverted and carried through the tank 23 which may be adapted to cool or condense the vapor, or it may be utilized as an indirect radiator coil. By closing the valve 19 the return from the radiators can be diverted to the receiving tank and the system operated without the aid of the pump, or the valves may be opened, the pump operated and a vacuum established in the receiving tank and the return pipes.

The construction of the radiator 6 is shown in detail in Fig. 5. In this figure the end section is shown connected with the contiguous one by a nipple 26 and having its drip opening 11 and steam chamber 27 separated from the steam chambers of the other sections by an imperforate wall 28 which prevents the direct passage of steam or water from one radiator section to the other. Above the base of this end section is a wall 29 forming, in this instance, a substantial continuation of the wall 28 and extending up within one leg of the section to a point near its upper end, where it is united with the wall of the section by a cross wall 30. A restricted opening 31 is provided in said cross wall leading from the passage formed by the wall 29 into the steam chamber at the top of the section, communicating on one side with the intake opening of the radiator, and on the other side with its drip opening. The steam entering the radiator will flow through the sections from one to another, and up through the passage formed by the wall of the section and the wall 29 and through the restricted opening 31 into the chamber 27. The opening 31 is very small and will only allow a sufficient amount of steam to enter the section to expel the air and allow the section to become heated. A plug 32 is provided in the upper end of the section to allow access to the restricted opening for cleansing purposes. The restricted opening allows the air driven ahead of the incoming steam and a relatively small quantity of steam to pass through from the radiator unit which receives the heating agent to another unit connected with a suitable exhauster. The condensation in the receiving unit or section flows back through the supply pipe to the boiler, while the exhauster and its connections take care of the condensation and air in the other unit or section. The radiator unit connected with the exhauster will form a radiating surface and the steam entering and being condensed therein will as water of condensation pass with the air into the drip pipe at a temperature much lower than the steam entering the unit having the supply opening.

In Figs. 6 and 7 I have shown a modification in the arrangement of the constricted passage which consists in providing a pipe 33 communicating with the base of the section at its lower end and with a T 34 at its upper end leading into the legs of the section near the top of the radiator. A partition 35 is provided in the pipe 33 having a restricted opening 36, the function of which corresponds to that of the restricted opening located within the radiator and illustrated in Fig. 5.

Fig. 8 shows still another modification consisting of a short nipple or pipe 37 connecting the contiguous sections of the radiator and provided with a partition and restricted opening corresponding to the one shown in the pipe 33.

The radiators shown in Figs. 6 and 8 have the imperforate wall 28 at the base separating the supply from the drip opening.

As illustrated in Fig. 2 the invention is applied to another form of heating system wherein a boiler 38 is shown having a service or supply pipe connection 39 with a coil 40 consisting of two heaters connected by a pipe 41 having the partition wall or diaphragm and restricted opening, such as is shown in the pipes 33 and 37 in Figs. 6 and 8. This pipe 41 forms the only means of communication between the coils of the heater, and one of the coils has a return or drip pipe connection 42 with a receiving tank 43. A pipe 44 leads from the pipe 42 into a stack 45, and is there provided with a suitable nozzle 46. The pipe 44 has a connection 47 with a tank 43. These pipes are provided with suitable valves corresponding in their function to those shown in similar relations in the system illustrated in Fig. 1, the coil for indirect heating being shown beneath the heater 40 and connected with the pipe 42. A valve 48 in the pipe 44 controls the connection of the exhauster or stack with the system, and a valve 49 closes the return to the boiler.

In Fig. 3 a slight modification is shown in the arrangement of the constricted passage, which consists in providing a pipe 50 on the outside of the radiator connecting an end section with a section near the opposite end, the pipe being provided with the wall and restricted opening, heretofore described and shown particularly in Figs. 4, 6 and 8. The radiator shown in Fig. 3 has the imperforate wall 28 separating the drip opening from the supply opening, and the only communication between the end section and the others is through the pipe 50 and the restricted opening therein. This opening, as well as those similar ones heretofore described and located in other parts of the radiator, insures the passage of a sufficient amount of steam into the last section to expel the air therefrom and heat the section, and at the same time prevents the accumulation of water of condensation in said section and the annoyance and inconveniece of removing the air therefrom.

I have shown two styles of heating systems with the different methods of exhausting the drip opening connections, but do not wish to confine myself to such an arrangement of the source of heat, and the exhausters and receiving tanks with respect to the rest of the system, as considerable modification may be made therein without departing from my invention.

It will be seen that in the present system the radiator is provided with an opening through which the water of condensation passes, and that there is an independent constricted opening through which air may escape from the radiator, this opening being independent of and different from the opening through which the water of condensation escapes. It will further be seen that this independent constricted opening communicates with what may be called the condensing chamber, said chamber being located within the radiator and so proportioned with relation to the constricted opening that all the steam which escapes through the constricted opening will be condensed therein, and that while the exhausting device may be in continuous connection with the system it will not be able to withdraw steam from the radiator and hence the waste of heat is thus prevented.

I claim as my invention:

1. In a heating system the combination with a source of heat of a radiator or other heater having steam chambers and supply and drip openings with a constricted passage forming a communication between said steam chambers intermediate said supply and drip openings arranged so as to allow only air and small quantities of steam to pass therethrough, said passage forming the only means of communication between them while the radiator is in operation, and an exhauster connected with said drip opening.

2. In a heating system the combination with a boiler and engine of a radiator or other heater having steam chambers and supply and drip openings with a constricted passage forming a communication between said steam chambers and intermediate said supply and drip openings arranged so as to allow only air and small quantities of steam to pass therethrough, said passage forming the only means of communication between them while the radiator is in operation, and an exhauster connected with said drip opening.

3. In a heating system the combination with a source of heat of a radiator having two sections, one having a supply opening and the other a drip opening, and a constricted passage located at or near the top of said radiator and forming a communication between said sections and arranged so as to allow only air and small quantities of steam to pass therethrough, said passage forming the only means of communication between the sections while the radiator is in operation, the steam entering said drip opening section being condensed therein and said drip opening section forming a radiating surface and the water of condensation with the air being discharged through said drip opening at a temperature much lower than that of the steam entering the said supply opening, and an exhauster connected with said drip opening.

4. In a heating system the combination with a source of heat of a radiator having steam chambers and supply and drip openings communicating respectively with said chambers and a wall intermediate and separating said chambers and preventing the direct passage of water from one to the other, said wall provided with a constricted passage leading from one chamber to the other and arranged so as to allow only air and small quantities of steam to pass therethrough, pipe sections for said supply and drip openings, and an exhauster connected with said drip opening.

5. In a heating system, the combination with a source of heat, of a radiator or other heater having steam chambers and supply and drip openings with a constricted passage intermediate the said chambers and intermediate said supply and drip openings arranged so as to allow only air and small quantities of steam to pass therethrough, said passage forming the only means of communication between them while the radiator is in operation.

6. In a heating system the combination with a source of heat of a radiator or heater having steam chambers and supply and drip openings and a wall intermediate said supply and drip openings and preventing the direct passage of water from one to the other, said wall having a constricted passage leading through it arranged so as to allow only air and small quantities of steam to pass therethrough, said passage located above the point where the water of condensation usually collects, and an exhauster connected with said drip opening.

7. In a heating system, the combination with a source of heat, of a radiator or other heater having steam chambers and supply and drip openings, a constricted passage connecting said steam chambers arranged so as to allow only air and small quantities of steam to pass therethrough, said passage forming the only means of communication between them while the radiator is in operation, said supply opening located at one side of said constricted passage and the drip opening located at the other side thereof, a receiving tank connected with said drip opening, and an exhauster also connected with said drip opening, substantially as described.

8. In a steam system a radiator having a loop or section provided with an air and steam chamber and a discharge opening communicating therewith, a contiguous section also having a steam chamber, a wall separating said chambers and preventing the passage of water from one to the other, said wall having a constricted passage leading from said contiguous section and through which only steam and air are conducted from one section to the other, said sections having supply and drip openings respectively and pipe connections therefor, and an exhauster communicating with said drip opening.

9. In a heating system a radiator having a section or head provided with an air and steam chamber and a drip opening communicating therewith, a second section also having a steam chamber and communicating with a supply opening, a duct leading from the steam chamber of said second section into said first named section and provided near the top of said section with a restricted opening above the normal level of the water of condensation in said steam section and forming a constricted passage through which steam and air are conducted from one section to the other, said passage being the only means of communication between said sections, and an exhauster connected with said drip opening.

10. In a heating system the combination with a source of heat of a radiator having steam chambers, one having a supply opening and the other a drip opening, a separating device for the two chambers provided with a restricted opening which forms a communication between the sections, said restricted opening of less cross sectional area than the corresponding area of the supply and drip openings, said restricted opening arranged so that only air and a relatively small quantity of steam can pass therethrough and forming the only means of communication between said chambers, and an exhauster connected with said drip opening.

11. In a heating system the combination with a source of heat of a radiator having steam chambers and supply and drip openings, the supply opening having a communication with the drip opening through said steam chambers, a portion of said communication of less cross sectional area than the corresponding area of said openings and forming the only means of communication between said supply and drip openings, said communication arranged so that only air and a relatively small quantity of steam can pass therethrough, and an exhauster connected with said drip opening.

12. In a heating system, the combination with a source of heat, of a radiator having steam chambers and supply and drip openings, said radiator having a passage therethrough connecting said openings and forming the only means of communication between them, a portion of said passage way being constricted and arranged so as to allow only air and small quantities of steam to pass therethrough, said passage forming the only means of communication between them while the radiator is in operation, and an exhauster connected with said drip opening.

13. A heating system comprising one or more radiators each of which is composed of a unit or section having a supply opening and a unit or section having a drip opening, said units having a restricted passage connecting one with the other above the normal level of the water of condensation in said first named unit, said second named unit receiving through said passage air and a relatively small quantity of steam, and a source of heat and an exhauster connected with said supply and drip openings respectively.

14. A steam heating system comprising a source of steam supply, a radiator connected therewith provided with an opening through which water of condensation passes, and with an independent constricted opening located above the normal level of the water of condensation in the radiator through which air may escape, a condensing chamber within the radiator with which said constricted opening communicates, and so proportioned with relation to said constricted opening that all the steam which escapes therethrough will be condensed in said condensing chamber, an exhausting device connected with said condensing chamber adapted to draw the air, free from steam therefrom.

In witness whereof, I have hereunto set my hand this 1st day of July, 1905.

JAMES McALEAR.

Witnesses:
A. C. PAUL,
C. MACNAMARA.